(12) United States Patent
Eble

(10) Patent No.: US 9,555,575 B2
(45) Date of Patent: Jan. 31, 2017

(54) BLOW MOLD TOOL WITH RETRACTABLE BASE PORTION

(71) Applicant: Pretium Packaging, L.L.C., Chesterfield, MO (US)

(72) Inventor: Raymond C. Eble, Sugarloaf, PA (US)

(73) Assignee: Pretium Packaging, L.L.C., Chesterfield, MO (US)

( * ) Notice: Subject to any disclaimer, the term of this patent is extended or adjusted under 35 U.S.C. 154(b) by 0 days.

(21) Appl. No.: 14/879,846

(22) Filed: Oct. 9, 2015

(65) Prior Publication Data

US 2016/0031147 A1 Feb. 4, 2016

Related U.S. Application Data

(63) Continuation of application No. 13/340,263, filed on Dec. 29, 2011, now Pat. No. 9,193,495, which is a continuation-in-part of application No. 13/087,883, filed on Apr. 15, 2011.

(51) Int. Cl.
| | |
|---|---|
| *B29C 49/54* | (2006.01) |
| *B29C 49/48* | (2006.01) |
| *B65D 1/02* | (2006.01) |
| *B29C 49/04* | (2006.01) |
| *B29L 31/00* | (2006.01) |

(52) U.S. Cl.
CPC ....... *B29C 49/4815* (2013.01); *B29C 49/4802* (2013.01); *B29C 49/541* (2013.01); *B65D 1/0261* (2013.01); *B29C 49/04* (2013.01); *B29L 2031/712* (2013.01)

(58) Field of Classification Search
CPC .................. B29C 49/541; B29C 2049/546
USPC .................. 425/522, 525, 541; 264/531
See application file for complete search history.

(56) References Cited

U.S. PATENT DOCUMENTS

| | | |
|---|---|---|
| 237,168 A | 2/1881 | Carpenter |
| 4,036,926 A | 7/1977 | Chang |
| 4,177,239 A | 12/1979 | Gittner et al. |
| 4,283,215 A | 8/1981 | Sherman |
| 4,465,199 A | 8/1984 | Aoki |
| 4,769,206 A | 9/1988 | Reymann et al. |
| 5,635,226 A | 6/1997 | Koda et al. |
| 6,224,817 B1 | 5/2001 | Villers |
| 6,277,321 B1 | 8/2001 | Vailliencourt et al. |
| 8,881,937 B2 | 11/2014 | Derrien et al. |

FOREIGN PATENT DOCUMENTS

WO  2010058098 A2  5/2010

*Primary Examiner* — Robert B Davis
(74) *Attorney, Agent, or Firm* — Lewis Rice LLC

(57) ABSTRACT

Blow molding tools and a method of blow molding which provide that the tool have a retractable push up section in the base which allows for the article molded by the tool to have a recessed base internal to an otherwise hollow structure. As the push up is moveable, adjustment of the push up portion can be performed during an automated blow molding operation so as to allow release of the blow molded article.

3 Claims, 4 Drawing Sheets

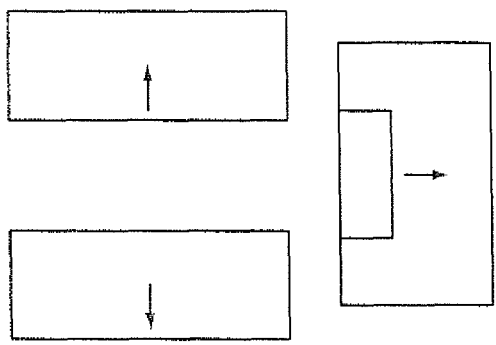
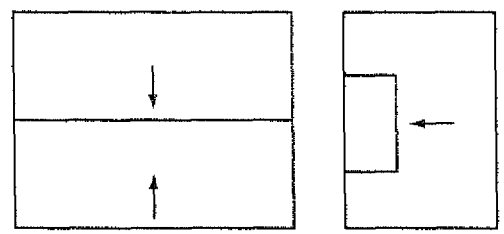
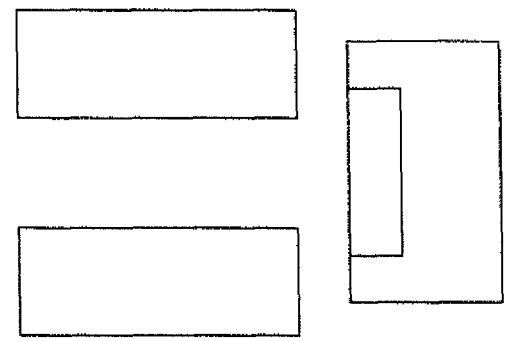
FIG. 2
PRIOR ART

BLOW MOLD TOOL WITH RETRACTABLE BASE PORTION

CROSS REFERENCE TO RELATED APPLICATION(S)

This application is a Continuation of U.S. patent application Ser. No. 13/340,263, filed Dec. 29, 2011, and currently pending, which is in turn a Continuation-in-Part (CIP) of U.S. Utility patent application Ser. No. 13/087,883, filed Apr. 15, 2011. The entire disclosure of both the above documents is incorporated herein by reference.

BACKGROUND

1. Field of the Invention

This disclosure relates to the field of blow mold tooling for use in blow molded plastics, particularly to a blow mold tool including a moveable component which allows for the blow molding of a container with a deeply indented base.

2. Description of the Related Art

Because of the various competing desires in packaging, a large number of products are changing from being packaged in glass or metal to being packaged in plastics. Plastics are generally lighter and more resilient than other packing alternatives, and can be recycled. There are also a wide variety of plastics available which can be selected depending on properties desired to properly hold the products sold in the container. The most common type of plastic containers are probably polyethylene terephthalate (PET) containers which can be blow molded and can provide for a clear finish in the final product which resembles glass.

It is generally well established that it is almost always less expensive to store products packaged in plastic containers in a taller vertical space than over a greater horizontal space. Storing items in a vertically efficient manner means that more items can be stored on a smaller surface area—i.e., less space is needed to store items in a warehouse or retail location. Further, when stacked vertically, items can be transported more efficiently on a smaller surface area resulting in fewer trips. Thus, the ability to easily and stably stack containers is very important and in most storage and transport scenarios, there are always a number of containers of the same size and shape stacked on top of each other.

The stacking of plastic containers, however, is often much more complicated than the placement of one container on top of another container. Most plastic containers provide for an extended neck which is taller than the main body of the container structure. This neck allows for a lid to easily be screwed, snapped, connected or otherwise positioned on and off. At the same time, however, when containers are stacked, generally the higher container in the stack will rest on the lower container's lid or neck due to this vertical extension. When this happens, the weight of that upper container is only distributed across the lid of the lower container (or the rim of the neck if the container is empty). Thus, the weight of the upper container is displaced on a smaller surface area comprised of just the lid (or neck) of the lower container. In this unstable orientation, the shoulder between the neck and the top surface of the container bears significant weight from the stack.

In some cases, the neck is simply unable to bear the necessary weight of the stacked containers above it. For example, in narrow necked containers, the lid or rim is so small when compared to the base of the upper container that the stack is unstable; i.e., the surface area of the base of the higher container is so large that it cannot be supported in a balanced manner by the lid of the lower container, which has a much smaller surface area. Thus, the stacking of these types of containers is generally not possible without supplemental support. One common practice is to place a cardboard or other sheet or support around the necks and between the rims of supporting containers in a stack in order to distribute the force of the containers resting above. Because of the problems inherent to stacking these types of containers, the containers are often distributed in packing boxes which only hold a single layer of containers, but can themselves be stacked, or with sheets of cardboard or another segregating material between the layers of the stack to provide for force distribution.

Even in container designs with wider necks, and thus broader surface areas for stacking, segregating sheets between layers of the stack are often still necessary to prevent the mass of the above containers from being focused too narrowly on the shoulder of the lower container, resulting in overall instability in the stacked container structure and possible malformation of the lower mass-bearing containers in the stack. Thus, even when these wider necked containers have traditionally been stacked for storage or transport, supports are utilized. For example, generally these wider neck containers are positioned to form a first layer. This first layer then has a piece of segregation material placed on it (usually a cardboard sheet), and a second layer is placed on the segregation layer. This process of sandwiching supplemental supports between the layers of containers in the stack is repeated until a desired stack height is obtained. Because of the use of the supplemental supports, stacks in these arrangements could result in containers at the second layer being positioned directly over containers in the first layer, or could result in offsets in the containers between the stacks to further distribute force.

While this form of transport and storage is effective, it has numerous inherent problems. First, this method tends to result in the production of a lot of excess packing material (used as segregation sheets and supports) which are discarded by the end user of the containers. The problem can exist at possibly three different points. The problem exists first when empty containers are stacked and shipped from the packaging manufacturing plant to the plant where they are to be filled. The problem exists again when the containers are filled and shipped to end retailers. The problem can also exist in the transport of used containers to a recycling or refilling facility. Thus, there is a possibility that segregation supports are created and discarded three times for the same load of containers. Second, this method results in excess costs and a loss in efficiency in the moving and storage of containers. The necessary supplemental supports add to the cost of storing and transporting the containers. Further, stacking the containers in this manner with supplemental supports can complicate the stacking and storing process.

U.S. patent application Ser. No. 13/087,883, incorporated herein by reference, describes a container which provides for a recessed portion of the base. This portion allows for a the neck of a lower container in a stack to be placed in the recessed portion of the base of the higher container, resulting in the bottom of the higher container being generally flush with the top of the lower container. This lid-within-base orientation among the stacked containers improves the stackability of the containers and, in eliminating the need for supplemental supports, remedies many of the problems inherent to traditional stacking methodologies (e.g., increased cost, increased waste and decrease efficiency).

However while this lid-within-base design provides numerous benefits for the storage and transportation of containers, currently there are problems in the art in the manufacturing of these recessed base containers.

One problem with the manufacture of these recessed base containers is that it is generally hard, if not impossible, to form the legs of the container around the recessed base. In a traditional blow-molding technique, the two- or three-part mold is closed and the parison or preform is blown into the final container form in the mold. Generally, in currently utilized blow-molding techniques, the neck of the container is associated with the portion of the mold that blows the air into the mold. Further, the base of the container is associated with the portion of the mold opposite from the point where the air is blown into the mold. Because of the trajectory of the air pressure into the preform, which creates the resultant container, it is generally difficult to attain the sharp corners needed to create the legs of the container around the recessed base; the air pressure inserted into the preform simply cannot make the sharp corners in the legs such that the blown-out preform completely fills the legs of mold. The top left and right ninety degree corners of the indent which comprise the recessed base block the air pressure applied at the neck of the container from causing the preform to stretch to this portion of the mold. Accordingly, it can be difficult, if not impossible, with the currently utilized blow-molding technologies to create the fully formed recessed base and legs shown in FIG. 3.

Further, the recessed base of these containers does not lend itself to traditional blow molding techniques with either a two or three part mold. Generally, when the mold is in the forming position (i.e., when the multi-part mold is closed and the parison or preform is being blown into final container form in the mold) there is a sufficient amount of support to retain the integrity of the container.

In this forming orientation, there is usually a raised step portion in the mold which forms the corresponding recessed base in the container. Notably, when the mold is separated into its component parts to release the container, there is an enormous amount of pressure and mechanical stress on the newly formed container. This is especially true for the area of the container surrounding the raised portion of the mold at the base. For example, although it is partially cooled in some processes after being blown into the form, the newly formed blow-molded container generally has not been fully set and stabilized (e.g., it has generally not been completely cooled into a set position and is generally still malleable). Stated differently, although partially cooled, the newly formed container is still vulnerable to malformation.

It is generally impossible to create a recessed blow molded container with a two-part mold. As demonstrated in prior art FIG. 1, the split in two-part molds which opens to the blow mold cavity where the hot parison or preform is placed is generally vertical in orientation. Thus, as seen in FIG. 1, the mold opening and closing action which is necessary to close the mold for container formation and release the formed container after blow-molding is a horizontal action that presses the internal portion of the vertically oriented molds together and apart. In molds which have a raised portion of the blow mold cavity (to create a recessed base in the formed container) the horizontal mold opening action necessary to release the formed container from the mold cavity would tear the base and the container apart.

The formation of recessed blow mold containers is also difficult with traditionally utilized three-part molds. Generally, traditionally utilized three-part molds are comprised of the same component parts of a two-part mold, with the addition of a third part of the mold which is located at the base of the two vertically oriented parts of the mold. Similar to the two-part mold, the cavities of the vertically oriented parts of the mold form the top, neck and side-body portions of the resultant container. The third component part of the mold, the base, forms the base of the resultant container. In order to create a recessed base in the resultant container, the base cavity of the mold generally contains a raised portion or step. In order to release the newly formed container, the base portion of the cavity usually falls vertically from the container. Then, the vertically oriented portions of the container are separated via a horizontal opening action. Alternatively, the vertically oriented portions of the container can be separated first via a horizontal opening action followed by the dropping of the base. One embodiment of a three-part mold of the prior art is depicted in prior art FIG. 2.

Due to the high pressure and mechanical stress exerted on the mold bottom when the container is released, even though there is no a direct conflict between the mold and recessed bottom portion of the container as is present in a two-part mold, the recessed base of the resultant container is subject to stripping and disorientation from the raised step and the rest of the bottom mold cavity retracting simultaneously. Due to the sensitive condition of the recently formed container, and its fragility to malformation and disorientation at this stage, the retraction of the raised step and bottom portion of the mold at the same time places extreme tensile pressure on the newly formed base of the container, increasing the likelihood that the recessed base could become stuck in the blow molding machine or could be unduly and improperly altered. The deeper this recess is, the greater the mechanical forces applied and therefore the increased likelihood of deformation. Thus, even with the traditional three-part mold, there is a high likelihood of malformation of the resultant bold molded container when a container with a recessed base is attempted, if the three-part mold even has the ability to create a mold with a sufficiently deep foot "channel" around the central indent.

SUMMARY

Because of these and other problems in the art, discussed herein are blow molding tools and a method of blow molding which provide that the tool have a retractable push up section in the base which allows for the article molded by the tool to have a recessed base internal to an otherwise hollow structure. As the push up is moveable, adjustment of the push up portion can be performed during an automated blow molding operation so as to allow for additional mechanical manipulation of the expanding preform and improved release of the blow molded article.

There is described herein, among other things, a blow mold comprising: a left half; a right half; and a base, the base further comprising a push-up portion; wherein the push-up portion of the base moves in a vertical manner; and wherein the vertical movement of the push-up portion is severable from the movement of the base.

In an embodiment of the mold the push up portion is generally cylindrical.

There is also described herein, in an embodiment, a method of blow molding for forming a container with a recessed base, the method comprising: providing a blow mold, the blow mold comprising: a left half; a right half; and a base, the base further comprising a push-up portion; placing the blow mold in the initial open position; placing the blow mold in the closed blow molding position; blowing the preform into a mold while simultaneously protruding the push-up portion of the base into the mold; and retracting the push-up portion of the base.

In an embodiment, the method further comprises returning the blow mold to the initial open position after the step of retracting.

In an embodiment of the method the protruding of the push-up portion begins when said preform contacts said push-up portion. In an alternative embodiment, the protruding of the push-up portion begins when said preform contacts and edge of said push-up portion.

There is also described herein a container with a recessed base formed by a process comprising the steps of: providing a blow mold, the blow mold comprising: a left half; a right half; and a base, the base further comprising a push-up portion; placing the blow mold in the initial open position; placing the blow mold in the closed blow molding position; blow molding the preform into a container while protruding the push-up portion of the base; retracting the push-up portion of the base; and returning the blow mold to the initial open position after the step of retracting.

BRIEF DESCRIPTION OF THE FIGURES

FIG. 2 provides a perspective view of a three-part blow molding mold of the prior art.

DESCRIPTION OF PREFERRED
EMBODIMENT(S)

Described herein, among other things, is a three-part mold for the creation of blow molded containers with a base part of the mold with a retractable portion which allows for the formation of a container with a recessed base internal to an otherwise hollow structure molded by the tool. The mold generally allows for a deeper base recess to be formed than was traditionally possible and provides that the resultant container is not as vulnerable to malformation and disfigurement as recessed-base blow molded containers formed from traditional three-part molds without such a retractable portion or ram.

Figure 1:
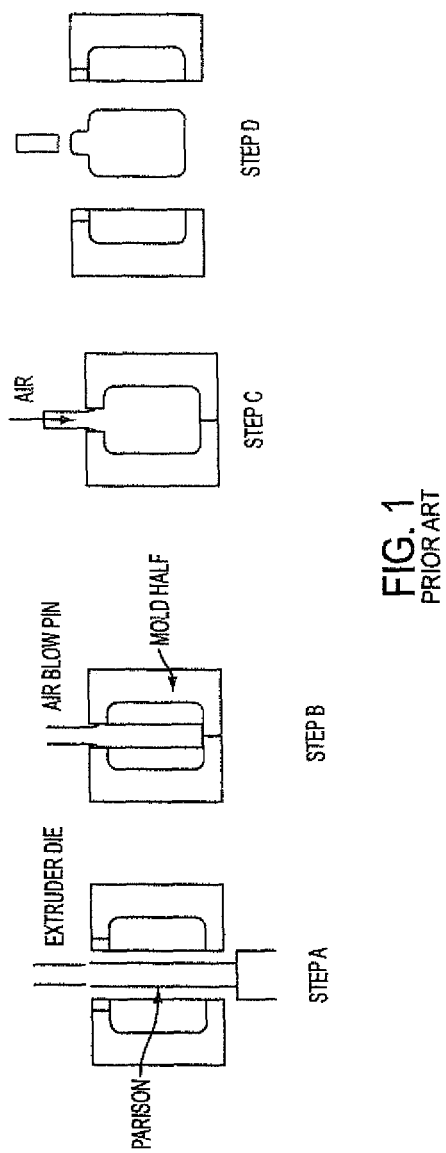
FIG. 1 provides a perspective view of a two-part blow molding mold of the prior art.
Figure 3:
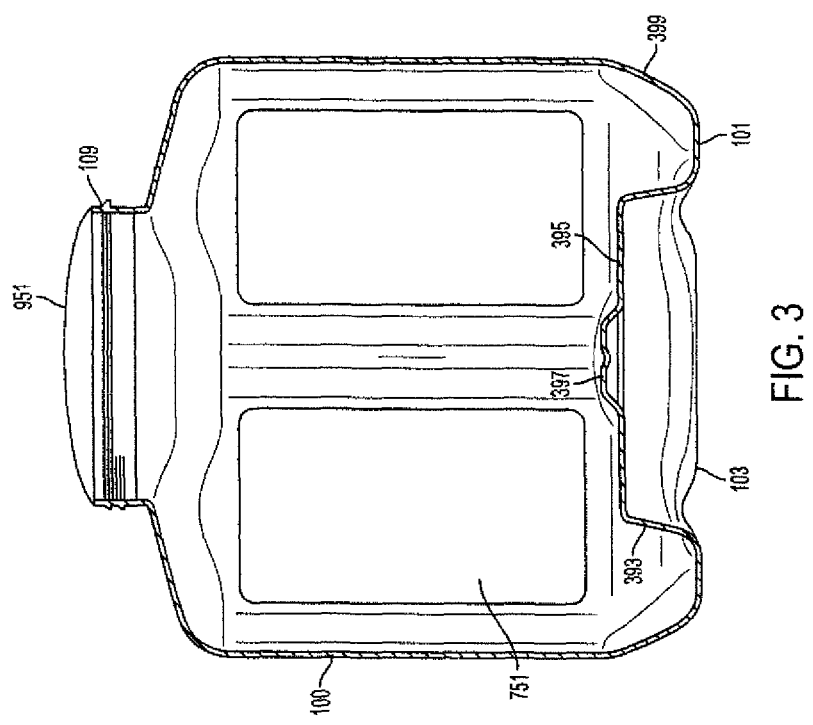
FIG. 3 provides a perspective view of an embodiment of a container. This embodiment is depicted as formed of translucent material to make internal structure visible.

FIG. 3 provides for a perspective view of an embodiment of a container (100). The container is a general container having a relatively wide-mouth which is designed to hold a variety of goods including bulk solids (such as powders or prepared solid foods (e.g., pretzels or cookies)), liquids, and solids in liquid. Containers of this type are often preferentially formed by blow molding as it can provide for efficient and cost effective molding as well as a desirable resultant design.

For ease of production by plastic molding techniques, it should be recognized that the container (100) will generally not include sharp corners or bends but the general components will instead smoothly flow into each other via rounded connections. While this is not required, it generally improves ease of manufacture. This disclosure, however, will often refer to shapes (such as squares) that have sharp corners. This is done purely for ease of understanding of the general orientation of the shape described. Nothing in this disclosure should be taken as a requirement that the container include perfectly flat, linear, or angled components in its construction. All components may include some smooth bend without altering the basic shapes discussed.

As can be seen in FIG. 3, the center of the base (101) includes a recessed portion (103) which, in the depicted embodiment, comprises a cylinder having generally vertical walls (393) and its upper end closed by a generally horizontal cap (395). The cap (395) also includes a further depression (397) which comprises a second recessed portion into the volume (751) of the container (100). The walls (393) will generally connect in a smoothly curving fashion to the base (101) generally by curves which curve smoothly outward in a convex fashion from the interior (751) of the container (100) into the hollow interior (399) of the recessed portion (103). The cap (395) will also generally connect to the walls (393) in a smooth fashion, however, this is likely to involve a tighter concave curve providing the inside with a sharper edge.

The recessed portion (103) will generally have a diameter which is slightly larger than the diameter of the neck (109) of the container. Specifically, the diameter of the recessed portion (103) will generally be close to, but still slightly larger than the external diameter of the lid (951) as can be best seen in FIG. 3. The height of the walls (393) will generally be similar, but slightly larger than the height of the neck (109). Specifically, the recessed portion (103) will generally have a height generally equal to the height of the neck (109) and lid (901) combination when the lid is placed on the neck in the standard fashion.

In the blow molding process of the present application which is utilized to create recessed-base containers similar to the container depicted in FIG. 3, the process generally begins with a plastic resin hot tube called a parison or a preform. The parison is placed within a split mold with a hollow cavity. The mold sides (and sometimes the bottom) are then clamped together, thus pinching and sealing the parison tube. Air is then blown into the tube, resulting in an expansion of the hot resin wall into the shape of the cavity. Generally, the neck of the container neck serves as the connection between the bottle body and the source of air which is used to inflate the container. Generally, these types of containers are formed using high speed stretch blow molding techniques as known to those of ordinary skill which provide additional strength to the plastic which forms the container.

Because blow-molding techniques generally require that the structure to be formed comprise a hollow balloon which is then pushed or molded into shape, the process is particularly well suited to hollow containers as the preform is inflated internally and pushed outward into the structure of the mold. The mold therefore is formed with an internal negative of the object to be formed. Thus, any recessed portions of the container have corresponding protrusions on the mold. This process is demonstrated in FIG. 4, which shows, step-by-step, an embodiment of the blow molding process of the current application and the resultant finished bottle.

Generally, as noted previously, in order to release the finalized container traditional two-piece molds will break apart into two halves which are arranged vertically side-by-side. In this way, once the preform has been formed into the mold, the two halves open which pulls the negative internal surface of the mold from the external surface of the container. From this point, the container can be blown off the air source to release it.

As should be apparent, the container of FIG. 3 cannot be ejected from the traditional blow mold with two halves as the recessed base portion would serve to provide part of the mold which is in the way to the ejection. Specifically, the recessed portion cannot be negatively formed on either half of the mold as the negative space inside the recessed portion is not connected to any side of the container by further negative space. That is, the protrusion necessary to form the base cannot be formed on either half of the mold. Doing so would result in the mold half being inseparable from the finalized container as the portion of the recessed area that is over the mold would cause the container to be transported with that half of the mold. In an extreme case, the mold attempting to release would damage the base of the container.

It has been traditionally understood in the art of blow molding that any negative recessed spaces in the container need to be formed from the sides of the container. Thus, in order to form a hollow center of the base, two part molds traditionally provide for a relatively small center space with a relatively wide opening leading to it. The molds may also be provided in multiple pieces; i.e., in a three-part mold to create relatively small base indents. This is the manner that a traditional petal-footed container was molded in the prior art, there can be a central recesses, but that recess includes negative access spaces which serve to create the petal shape of the base allowing access from both the sides and the base.

The container of FIG. 3, however, does not include the negative space approaching the central recess (103) and as discussed in the copending application Ser. No. 13/087,883, rather it utilizes the space about the base both to rest on a lower container's shoulder and to provide the container with a solid footing. Thus, it would be undesirable to dramatically increase the size of the recessed portion so as to allow it to access at least one side of the container as in a petal-footed container.

Figure 4:
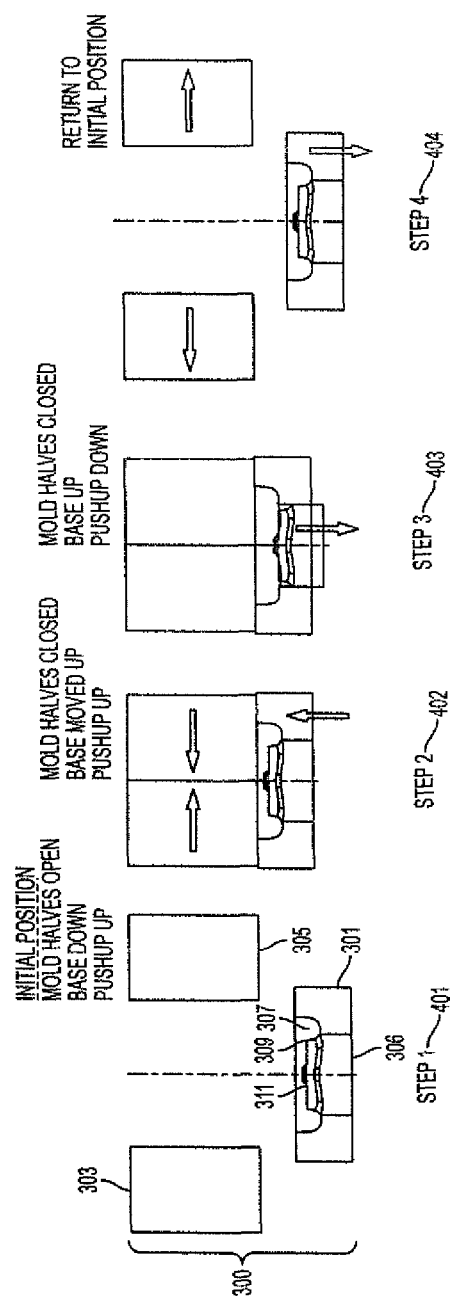
FIG. 4 provides a perspective view of the three-part blow molding mold and the steps of the method for blow molding of the present application.

Instead, the container can be formed utilizing an embodiment of the blow mold shown in FIG. 4. In the depicted blow mold (300) the mold itself (300) comprises three pieces: a base (301), a left half (303), and a right half (305). The left half (303) and right half (305) are of a standard design of a traditional blow mold tool known to those of ordinary skill in the art. As such, the left half (303) and right half (305) will provide tooling and structure for the vertical walls (393) of the sides of the blow molded container.

The base (301) is designed to come up from the bottom of the molding machine and smoothly connect with the left half (303) and right half (305) to form the depicted three-piece mold (300) in a closed position. The connection of the left half (303), right half (305) and base (301) of the molding machine from the open position to the closed position can been seen in step 1 (401) and step 2 (402) of FIG. 4. As seen from FIG. 4, in the depicted embodiment, when in the closed position (402), the left half (303), right half (305) and base (301) of the mold (300) generally smoothly connect together with no substantial voids there-between. Generally, in this closed position (402) the mold (300) generally resembles a square or cube-like structure.

The base (301) of the depicted three piece mold (300) further includes a push-up portion or ram (306). This push-up portion (306) is placed within a chamber of the base (301). Generally, this push-up portion (306) is a retractable mechanism, retracting and protruding in a generally vertical manner with respect to the internal negative space of the mold (300). Stated differently, the push-up portion, when in the protruded position (depicted in step 2 (402) of FIG. 4) protrudes into the negative shape of the mold that forms the base (101) of the container—the push-up portion (306) corresponds to the recessed portion(s) of the base (101) of the container. Thus, this push-up portion (306) of the mold (300) is used to form the base (101) of the container and the internal recessed portion(s) of the base (101) of the container.

Notably, the push-up portion (306) is generally not a rigid mold part of the base (301) but, instead, comprises a mold (300) element which is moveable relative to the base (301). The vertical movement of the push-up portion relative to the base (301) and the rest of the mold (300) in the closed position (402) is generally created by any suitable mechanical force or mechanism known to those of ordinary skill in the art including, but not limited to, cams, air or hydraulic cylinders.

In operation, the mold (300) will generally operate as follows, as depicted in FIG. 4. In a first step (401), the left half (303), right half (305) and base (301) are in the initial, open position. In this initial, open position the mold left half (303) and right half (305) are open, the base is down and the push-up portion (306) is down in the recessed position in the base (301). In a second step (402), the left half (303), right half (305) close and the base (301) moves up (with the push-up portion (306) in the base (301) still in the down, recessed position) into the closed position of the mold (300). Notably, the exact order of the pieces coming together in this second step (402) is variable, generally any manner in which the pieces can come together from the open position (401) to the closed position (402) is contemplated.

Once all three pieces of the mold (300) are positioned in the closed position, the blow molding of the preform into the container will begin. Generally, any suitable method of blow molding is contemplated in this application. Further, in this second step (402) the push-up (306) moves up into a protruded position simultaneously as the preform is blow molded. This simultaneous blow molding and protrusion of the push-up portion (306) alters the forces and pressures in container formation which create the base (101), allowing for the clear and defined formation of the container's vertical walls (393), horizontal cap (395) and base (101). Specifically, as the air is being pushed into the preform, the preform will generally be pushed radially out from a centralized point within the preform. In this arrangement, the base (101) will initially be formed at the center (as it is the closest point to the air source) and the outer bottom corners of the base (101) will generally be the last portion of the base to form.

It should be apparent that if the moveable portion (306) was positioned in its highest (furthest into the mold cavity) position at the start of the blow process, the preform expansion would tend to "bridge" the channel (307) which is used to form the foot of the container. Specifically, the material of the preform would first contact the ram (306). As it flowed out toward the channel (307), the material would be more inclined to first flow horizontally across the channel (307) bridging the channel (307). It would then require a very large amount of time and air pressure, to get the bridge of preform material to push down into the channel and assume the correct shape.

The issue is quite simple, because the air is generally applied to the preform at an area above the center of the base in a relatively radial fashion, there is usually not enough vertical force to push the material into the channel (307) compared to the horizontal force to push the base (101) into the side wall.

In order to deal with this problem, the ram (306) is designed to rise as the preform is expanding. Specifically, the push-up (306) will serve to provide a mechanical force to the base in a vertical direction. This serves to force the material of the preform to flow around the corner (309) and helps to make sure that the material is pushed into the channel (307). In effect, the ram (306) provides an additional molding force (in addition to the air pressure) to serve to direct the preform material into the correct position and form the base (101) of the container.

The exact timing of the movement of the push-up (306) compared with the blowing from air will depend on the specific size of the container, the size and depth of the recessed portion (103) and the blow molding techniques being used. However, it will often be the case that the push-up will be maintained in it lowest (or "flush") position (403) until the preform has had material pushed close to or beyond the corner (309). IN this way, the mechanical stress serves directly to push the material into the channel. However, in alternative embodiments, the push-up (306) can extend as soon as the preform material contacts the push-up surface (311) thus providing a counter motion to the air blow motion on the base (101) and providing for increased flow of material over the surface (311) and into the channel (307).

After the expansion of the preform in the negative space of the mold (300) to form the container, in a third step (403) the push-up portion (306) in the base (301) will generally be retracted from the base (301) of the mold (300) to clear the recessed base of the container. As seen in step 3 (403) of FIG. 4, this retractable push-up portion (306) of the base (301) of the mold (300) retracts from the blow molded, formed container and the left half (303), right half (305) and base (301) of the three-part mold (300) while the three-part mold (300) is still together positioned in the closed form. This reduces the mechanical stress and high pressure which can be exerted on the feet of the container that would be present in previous methods and manufacturing processes for blow molding.

Specifically, as the push-up (306) drops first, the inner wall (393) is released before the outer wall (399) of the base. This sequential release provides that less force is applied to the base (101) as the bottom (301) of the mold (300) is removed. Specifically, the force of separation of the base (101) from the mold is separated into two steps of reduced force, instead of a single step with significantly increased force. This can reduce the likelihood of mold removal causing deformation of the container.

In a fourth step (404), once the push-up portion (306) has been withdrawn, the left half (303) and the right half (305) will open in the standard fashion and the base (301) will withdraw downward, returning the mold to the initial position, allowing the container to be ejected in a standard fashion as is known to those of ordinary skill.

As demonstrated in FIG. 4, the push-up portion (306) will often pull away from the container and move relative to the base (301). In other words, when the base (301) retracts it does so in two discreet steps. First, the push-up portion (306) retracts from the closed, molding position in step 3 (403). At this time, the base (301) is still up. Then, in step 4 (404), the base (301) falls down from the closed molding position to the initial position.

As should be apparent from the above, this two-part retraction of the base (301) of the mold (300) frees the recessed portion of the base (101) of the container prior to freeing the rest of the base (101) of the container. This two-part movement thus reduces the high pressure and mechanical stress exerted on the container base (101) when the container is released, thereby reducing the probability that the container will be stripped and/or disoriented from the raised step and the rest of the bottom mold cavity retracting simultaneously. Also, the simultaneous protraction of the push-up portion (306) and the expansion of the preform alters the forces utilized to create the container, making it easier to form a container with defined legs and sharper angles at the recessed base.

In a still further embodiment, as the base (301) retracts in step 4 (404), the push-up portion (306), can actually serve to push upwards relative to the rest of the base (301). This can serve to provide a push to clear the container from the base (301) should the container still be in contact with the base (301) as the container is cleared from the mold (300) and, thus, can further assist in ejecting the container from the mold and inhibiting deformation.

The methodology and molds discussed above provide for particular advantage in making containers such as that shown in FIG. 3 due to the depth and size of the recess (103) and the fact that access to the recess from the sides is generally undesirable. However, it should be recognized that a mold having a push-up portion can be used in a variety of other container applications. In an embodiment, the push up can be used to form a container with a recess base portion (103) in a two part mold, a process that was previously impossible as the ram (306) can be retracted prior to the mold opening.

The push-up (306) can also be used to provide for decorative shapes for the base of containers, or for the sides or tops of objects, depending on how the object is oriented during blow molding. Specifically, this methodology and molding mechanism may be used to form a recess, and even a very deep recess, on the portion of the object formed on the base of the mold. This was something that was not previously possible and therefore often resulted in objects having to be formed in a less than ideal orientation. This need to orient to avoid a recess on the base is eliminated which can provide for additional efficiency and options in mold manufacture.

Further, while FIG. 4 contemplates only a single retractable portion (306), one of ordinary skill would understand that alternative embodiments may utilize multiple push ups (306). This may be separate, may partially overlap, or may be nested within each other to provide for recesses with a variety of different shapes instead of just the cylindrical recess (103) shown in FIG. 3.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A blow mold comprising:
   a left half;
   a right half; and
   a base, the base further comprising a push-up portion;
   wherein, the blow mold has an open position and a closed position;
   wherein, the blow mold is configured to accept a preform blown into the blow mold in the closed position while the push-up portion of the base simultaneously protrudes into the mold; and,
   wherein the blow mold is configured to begin the protruding of the push-up portion when said preform contacts an edge of said push-up portion.

2. The blow mold of claim 1 wherein said push up portion is generally cylindrical.

3. The blow mold of claim 1 further configured to retract the push-up portion later from protruding and further configured to the open position after the retracting.

\* \* \* \* \*